(12) United States Patent
Nowotny et al.

(10) Patent No.: US 6,316,744 B1
(45) Date of Patent: Nov. 13, 2001

(54) MACHINING HEAD AND PROCESS FOR THE SURFACE MACHINING OF WORKPIECES BY MEANS OF A LASER BEAM

(75) Inventors: Steffen Nowotny, Radebeul; Siegfried Scharek, Freital, both of (DE)

(73) Assignee: Fraunhofer-Gesellschaft zur Forderung der Angewandten Forschung E.V., Munich (DE)

( * ) Notice: Subject to any disclaimer, the term of this patent is extended or adjusted under 35 U.S.C. 154(b) by 0 days.

(21) Appl. No.: 09/518,606

(22) Filed: Mar. 3, 2000

(30) Foreign Application Priority Data

Mar. 4, 1999 (DE) .............................. 199 09 390

(51) Int. Cl.[7] .............................. B23K 26/14; H01S 3/22
(52) U.S. Cl. .............................. 219/121.84; 219/121.85; 372/58; 372/61
(58) Field of Search .................. 219/121.67, 121.68, 219/121.69, 121.7, 121.71, 121.72, 121.73, 121.84, 121.85; 372/55, 58, 59, 60, 61

(56) References Cited

U.S. PATENT DOCUMENTS

| | | |
|---|---|---|
| 4,724,299 | 2/1988 | Hammeke . |
| 5,321,228 * | 6/1994 | Krause et al. . |
| 5,418,350 | 5/1995 | Freneaux et al. . |
| 5,477,025 * | 12/1995 | Everett et al. . |
| 5,477,026 * | 12/1995 | Buongiorno . |
| 5,837,960 * | 11/1998 | Lewis et al. . |
| 5,961,862 * | 10/1999 | Lewis et al. . |
| 5,993,550 * | 11/1999 | Eloy . |
| 6,046,426 * | 4/2000 | Jeantette et al. . |

OTHER PUBLICATIONS

"Oberflachenbehandlung mit Lasertrahlung", Springer, p. 225–231, E. Beyer and K. Wissenbach, 1998.

* cited by examiner

*Primary Examiner*—Tom Dunn
*Assistant Examiner*—Kiley Stoner
(74) *Attorney, Agent, or Firm*—Barnes & Thornburg

(57) ABSTRACT

The invention relates to a machining head and to a process for the surface machining of workpieces by means of a laser beam, in which coating, alloying in the area close to the surface or dispersion of a peripheral zone of the base material with powder particles can be carried out using a pulverulent filler supplied. The invention is intended to make it possible to maintain, independently of direction, a virtually constant mass flow rate of the powder supplied, the intention being to form a uniform hollow powder jet. According to the invention, this object is achieved by the fact that in a housing of the machining head a turbulence chamber is formed, into which a powder-gas flow is introduced at least via one entry opening and the powder-gas flow is directed through a conical annular gap, as a hollow coaxial jet, as is the laser beam guided through the housing, onto a workpiece surface, and stabilizing passages, which are aligned parallel to the longitudinal axis of the laser beam, are present in a radially symmetrical arrangement between the turbulence chamber and the annular gap.

24 Claims, 2 Drawing Sheets

Figure 1:
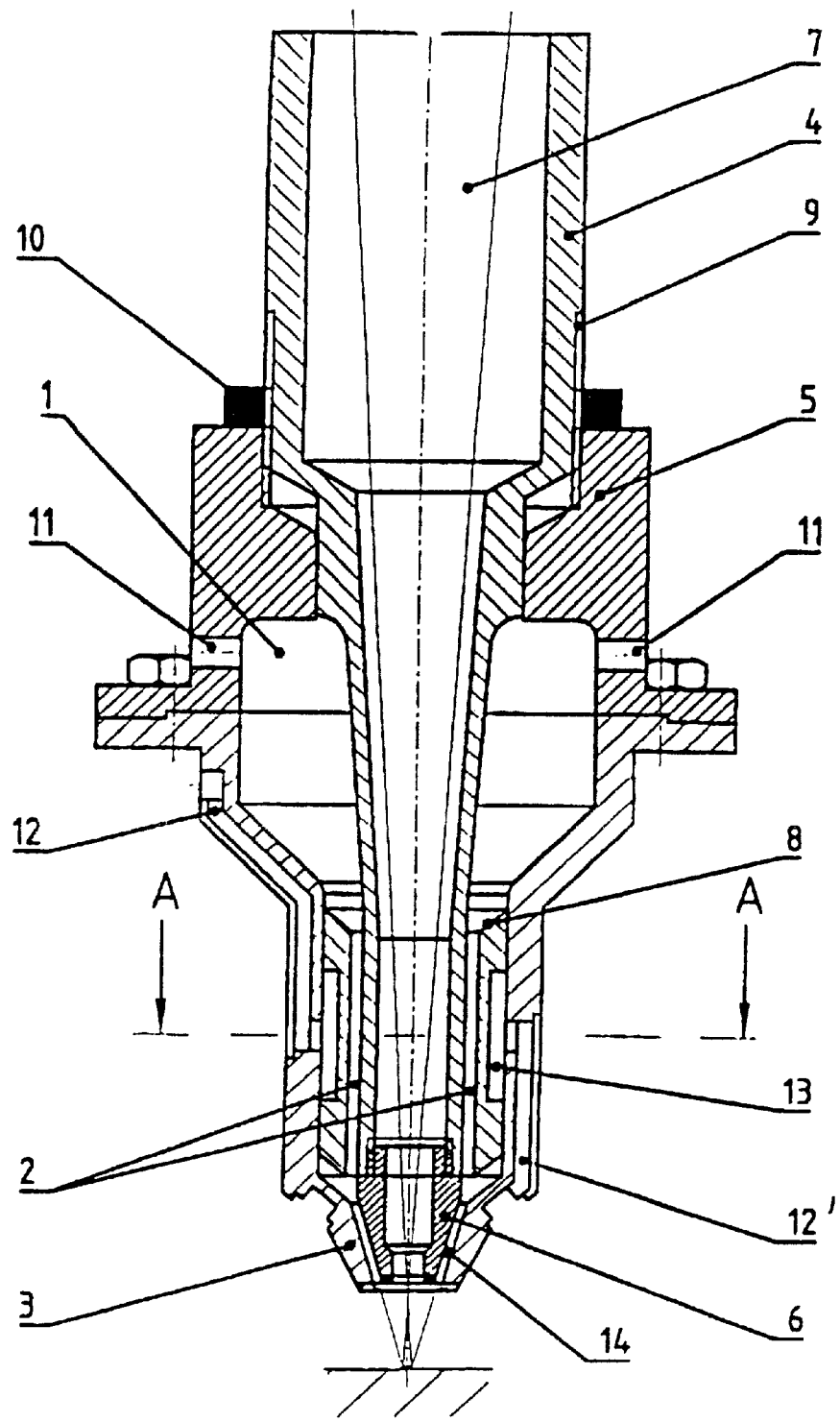

MACHINING HEAD AND PROCESS FOR THE SURFACE MACHINING OF WORKPIECES BY MEANS OF A LASER BEAM

The invention relates to a machining head and to a process for the surface machining of workpieces by means of a laser beam, in which coating, alloying in the area close to the surface or dispersion of a peripheral zone of the base material with powder particles can be carried out using a pulverulent filler which is supplied, so that the geometry and/or the surface properties of a workpiece can be influenced in a controlled manner. The invention is particularly suitable for applications in which a relative movement takes place between the laser beam used and the workpiece, and this relative movement exhibits frequently changing directions. The solution according to the invention can be used for coating and regenerating tools, dies and components, such as for example for foundrywork, metal forming, cutting engineering and in the motor and turbine construction sector. Moreover, it is suitable for the machining processes which are covered by the terms "Rapid Prototyping" and "Rapid Tooling".

In "Oberflachenbe-handlung mit Laserstrahlung" [Surface Treatment using Laser Radiation]; Springer-Verlag; 1998, pages 300 and 301, E. Beyer and K. Wissenbach have pointed out possible ways of pneumatically conveying powders and, inter alia, have also pointed out so-called coaxial nozzles, in which a laser beam can be directed onto a workpiece through such a partly hollow nozzle in order to heat the surface of this workpiece, and a powder-gas flow can also be directed onto the surface of a workpiece through such a nozzle, in the form of a conically tapering hollow jet.

In addition, U.S. Pat. No. 4,724,299 has disclosed a corresponding machining head which has a two-part housing. The two parts of this housing can be displaced telescopically with respect to one another, in order to make it possible to adapt the focal position of a powder jet to the focal position of the laser beam, so that this powder jet is heated even before it strikes the surface of a workpiece. In this case, both the powder jet and the laser beam have to pass together through a nozzle-like opening. However, this requires a suitable diameter of such a nozzle-like opening, and accordingly a cylindrical powder jet of appropriate size is directed onto the surface of a workpiece, so that the powder is supplied in excess and accordingly high powder losses are experienced.

In this solution, the powder is introduced together with a gas stream via powder inlets and it passes into a relatively large chamber through holes which are formed in a perforated disk. Turbulence is generated in the chamber, and particularly in the case of powders whose individual constituents have different densities, this may lead to segregation. From this chamber, the powder passes directly into a conical annular gap, the reduction in the cross section of which results in an increase in the conveying speed, which has an adverse effect on the utilization of the powder and the layer-forming operation. The turbulence in the chamber may result in changing pressure conditions and consequently also changing conveying speeds, so that the rate at which powder is conveyed may change over the course of time; this has an adverse effect particularly when applying layers or forming desired contours on such workpieces.

A cooling system is attached to the outside of the device described in that document, but is not necessarily able to cool sufficiently the particularly critical areas, and in addition the entire wall of the housing component lies between the cooling means and the interior.

The object of the invention is to provide a means which makes it possible to carry out surface machining by means of laser beams, with which means a powder is supplied and the mass flow rate of powder supplied can be kept virtually constant irrespective of direction and the hollow powder jet can be maintained at a uniform level.

According to the invention, this object is achieved by means of the features of claim 1. Advantageous configurations and refinements of the invention result from the features given in the dependent claims.

A machining head according to the invention can carry out a relative movement with respect to the surface of a workpiece in at least two axes, and it accordingly is possible to move such a machining head on its own, the workpiece on its own or the machining head and the workpiece together, so that it is possible to achieve rapid, locally controlled surface machining by laying tracks, even with frequent changes of direction.

The machining head is constructed in such a way that it can be used to guide a laser beam so as to form an adjustable beam spot on the surface of a workpiece. A housing is designed suitably for this purpose, so that a cavity is present parallel to the longitudinal axis of the laser beam, by means of which cavity the laser beam can be directed onto the workpiece surface in a suitably focused manner.

Inside the housing, a turbulence chamber is formed in a rotationally symmetrical manner around the cavity through which the laser beam is guided and into which a powder-gas flow is introduced through at least one entry opening, preferably in the upper part of the turbulence chamber. In the turbulence chamber, the powder is distributed uniformly in the form of a cloud of powder which forms coaxially with respect to the laser beam, and the powder is mixed intensively. In its lower area, the turbulence chamber leads, preferably via an inlet funnel which tapers conically, into a plurality of stabilizing passages which are arranged radially symmetrically and parallel to the longitudinal axis of the laser beam, and are distributed at regular intervals over the circumference. The stabilizing passages then lead into an annular gap which tapers conically in the direction of the surface of the material and in which there are no ribs or other vortex-forming elements. The powder then leaves the annular gap, also as a conically tapering hollow powder jet, the focal point of this conically tapering hollow powder jet lying outside the housing and consequently also outside the machining head. Advantageously, the annular gap is designed in such a way, and has a corresponding angle of inclination, that, taking into account the distance to the surface of the workpiece, it forms a conically tapering hollow powder jet whose focal point lies directly on the surface of the workpiece.

In this case, the size of the focal point of the hollow powder jet should at least approximately correspond to the size of the beam spot of the laser beam on the surface of the workpiece, so that optimum utilization of the powder can be achieved.

The stabilizing passages arranged between the turbulence chamber and the annular gap, in particular their alignment parallel to the longitudinal axis of the laser beam and also their shape and dimensions, enable powder to be conveyed uniformly with very low fluctuations in the mass flow rate of powder of less than 5%, so that when the surface of a workpiece is correspondingly machined it is substantially possible to dispense with additional measures, such as controlling the laser power, and yet obtain a desired layered structure or to influence surface areas as desired by performing alloying or dispersion on a workpiece.

The length of the stabilizing passages should be at least 10 mm in order to achieve the desired effect.

Advantageously, there may also be two entry openings at the turbulence chamber, which are preferably arranged on radially opposite sides of the turbulence chamber. In this way, it is also possible to use powders of different compositions, which are then mixed homogenously in the turbulence chamber and can then be directed onto the surface as a homogenous mixture, via the stabilizing passages and the annular gap.

The stabilizing passages are expediently dimensioned in such a way that the sum of their clear cross-sectional areas is at least no less than the clear cross-sectional area of the one or more entry openings. This allows virtually constant pressure conditions and flow velocities to be achieved in the turbulence chamber, the stabilizing passages and the annular gap leading, as mentioned above, to uniform conveying of the powder.

Moreover, it is advantageous if the housing is formed from two parts which can be displaced relative to one another along the longitudinal axis of the laser beam, as in the manner of a telescope. In this case, the two parts also form the annular gap, by means of walls which are of correspondingly conically tapering design. If a suitable relative movement of the two parts of the housing takes place, it is then possible to vary the clear width of the annular gap while maintaining the cone angle. This varying of the clear width of the annular gap makes it possible to influence the instantaneous conveying velocity of powder and the diameter and cross-sectional area of the powder jet on the workpiece surface. It is possible to achieve a relatively low time constant, which is significantly lower than that achieved when controlling the powder-gas flow which is introduced into the turbulence chamber.

The two parts of such a housing may be connected by means of a conventional screw thread, in which case, if the pitch of such a screw thread is suitably small, it is possible to achieve a very accurate adjustment of the clear width of the annular gap. In the most simple case, a set position of the two parts of a housing can be established by means of a conventional locking nut.

However, it is also possible to provide an additional rotary drive, by means of which it is possible to adjust the clear width of the annular gap even during machining. This adjustment may have a beneficial effect if a movement is carried out in virtually the opposite direction, i.e. at such reversal points, or alternatively the powder supply can be interrupted very quickly if idle travel is being carried out, i.e. the head is moving over areas of a workpiece surface which are to remain untouched.

As an alternative to such a rotary drive, it is also possible to use a suitable linear drive, by means of which this relative movement of the two parts of the housing can be carried out. In the simplest form, it is also possible to use an electromagnet for this purpose, although this is preferably used when only an opening and closing movement of the annular gap is required.

If the annular gap is closed using one of the variants described above, or the flow of powder onto the surface of the workpiece is blocked, for example as a result of the laser machining head being closed on its side facing the workpiece surface, it is advantageous for the powder supply to be blocked at the same time. To do this, it is possible to close a valve arranged at the entry opening or openings. However, it is more expedient to connect to the turbulence chamber a powder-gas outlet passage, which during normal operation is closed by means of a valve. However, if the annular gap is closed, this valve should be opened at virtually the same time, in order to avoid an increase in pressure and an accumulation of large quantities of powder in the turbulence chamber. The powder-gas outlet passage is advantageously connected to the powder reservoir from which the powder normally moves into the turbulence chamber, so that losses of powder can be avoided in this way.

Advantageously, the housing should at least predominantly comprise a material of good thermal conductivity, so that even prolonged operation of a machining head according to the invention is possible. For example, the housing may be composed of copper and/or a copper alloy, such as brass. The two parts of a housing may quite possibly be composed of different materials, in which case, however, it is necessary to take into account their coefficients of thermal expansion.

Moreover, it is advantageous if the housing or the two parts of such a housing is/are provided with a wear-resistant coating, as is the case, for example, with nickel or nickel alloys. Such a coating may have the further advantage of having a higher level of reflection for the laser radiation while being more difficult for any spatter to adhere to.

Owing to the undesirable heating of a machining head according to the invention, which is bound to occur during prolonged operation when machining relatively large workpieces or those of a complex shape, a cooling system is integrated into the housing. For this purpose, annular passages are formed as cooling passages through which, for example, suitably temperature-controlled water can be circulated and advantageously guided through a heat exchanger outside the machining head.

By integrating the cooling passages and arranging them in particularly critical areas, i.e. in the vicinity of the annular gap, it is possible to provide good dissipation of heat, so that reduced eating is found to occur.

At that part of the housing which faces toward the surface of the workpiece, it is possible to form an additional protective layer or to arrange a corresponding protective disk. In this case too, the reflection properties and the surface properties in the event of spatter should be taken into account.

Moreover, it may be advantageous if those parts of a machining head according to the invention which are subjected to particularly high loads are exchangeable. These parts include, for example, a corresponding nozzle tip which is drilled into a hollow form and is used to direct the laser beam onto the surface of the workpiece. In this case, the outer circumferential surface of such a nozzle tip may form the inner wall of the annular gap.

In a corresponding fashion, it is also possible to use an outer nozzle, which is preferably of conical design, in which case a cone is formed both on the outer side of this outer nozzle and on the inner circumferential surface. The inner circumferential surface of this outer nozzle then forms the outer wall of the annular gap. Since it is known that a high level of wear is to be expected at the walls of the annular gap, owing to the movement of powder and the temperatures, which are bound to be higher in those areas, these parts can be exchanged relatively easily and quickly when necessary.

The invention can be used to form both individual track coatings and surface coatings, as is the case in particular also with free-formed surfaces, to protect against wear and corrosion. Moreover, repair coatings, such as those which are required, for example, in forming tools owing to breakage or wear, can be carried out. However, it is also possible to generate simple bodies and bodies of complicated shape, resulting in compact bodies which can be subjected to high mechanical and thermal loads. This is the case, for example, in rapid-prototyping and rapid-tooling processes. The invention can be used to produce a single-layer or a multilayer structure with several hundred single tracks which overlap both vertically and horizontally. Since such processes require uninterrupted beam action times lasting several hours, the design with the appropriate selection of materials and the integrated cooling system is particularly advantageous.

The high level of precision with which the powder can be supplied makes it possible to maintain a high geometric accuracy of the individual tracks (width, height, tolerances along the track), leading to a highly accurate shape and low tolerances when contours are coated. Moreover, it is possible to obtain correctly shaped hollow and volumetric bodies with a correspondingly high dimensional accuracy.

Moreover, the material composition in a body produced in this way or a corresponding coating can be adjusted relatively easily and in a controlled fashion. For this purpose, various powders or powder mixtures with different mixing ratios can readily be supplied. For example, it is possible to supply only one powder to the turbulence chamber over a certain period, and, to influence specific local areas of a workpiece it is possible for at least a second powder, for example, to be introduced temporarily into the turbulence chamber.

Since the powder is supplied coaxially with respect to the laser beam, changes in direction during the relative movement between the machining head and the workpiece are of no significance. The homogenous distribution of powder over the cross-sectional area of the hollow powder jet works in the same way.

In various processes, it may be necessary to maintain the distance between machining head and the workpiece surface constant by moving the machining head in the vertical direction, so that the focal point of the hollow powder jet and also the size of the laser beam spot on the surface of the workpiece can be kept constant. In this case, the machining head may be connected, for example, to a suitable manipulator, such as for example an industrial robot, preferably an articulated-arm robot. In this case, an industrial robot enables the machining head to be moved in the three degrees of freedom which are the minimum requirement.

The stabilizing passages arranged between the turbulence chamber and the annular gap ensures that the powder remains stable, after it has been forced into the stabilizing passages, and is able to enter the conically tapering annular gap, the clear width of which is advantageously also adjustable, with a defined direction of flow and at a defined flow velocity. The annular gap can be used to form a conical, hollow powder jet with a minimum diameter of as little as 1 mm. The annular gap then forms the end of the flow passage, so that the flow of powder is not interfered with by any further nozzle elements. In this case, the focal point of the hollow powder jet generally lies outside the machining head, and consequently the smallest cross section of this hollow powder jet can be utilized directly. By forming the annular gap between the nozzle tip and an outer nozzle, it is possible to disperse all the powder particles in a core jet in concentrated form and to substantially avoid powder scatter at the nozzle outlet. This results in a high level of utilization of the powder supplied and makes it possible to increase the process stability, since powder which is scattered in an uncontrolled manner is substantially avoided.

Figure 2:
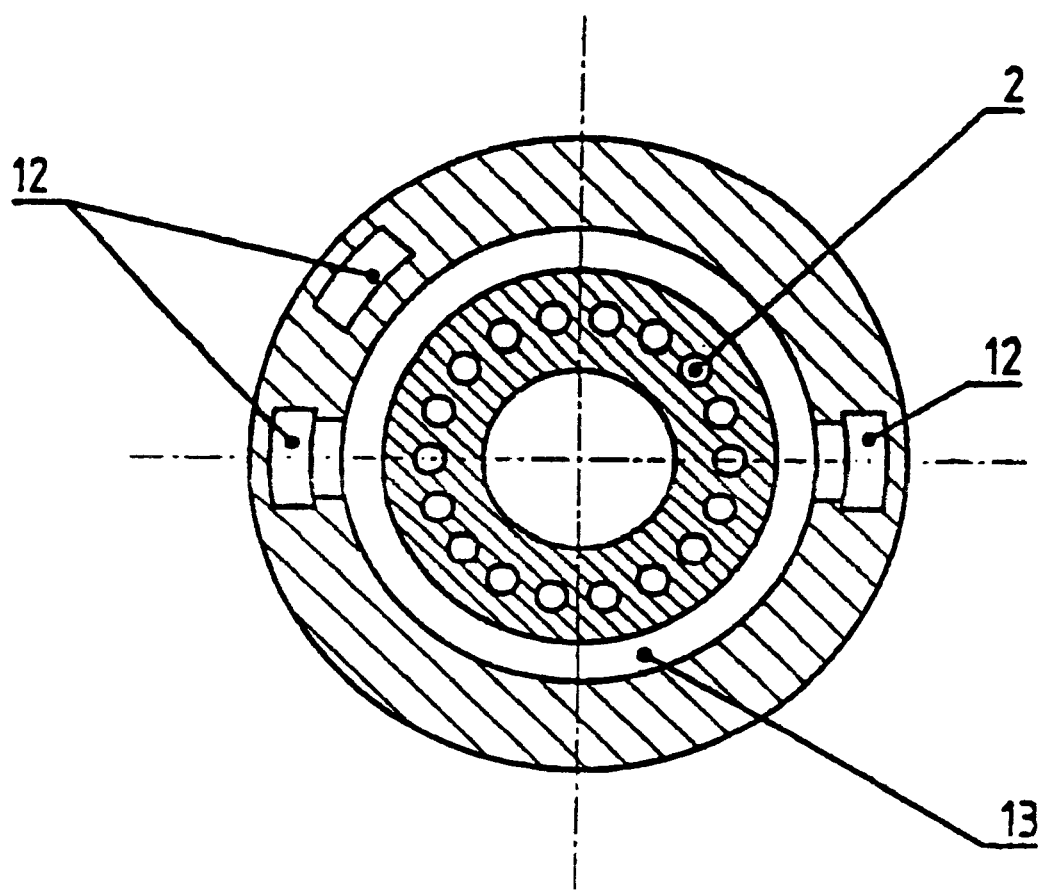

The invention will be described by way of example in the following text and with reference to the drawings, in which:

FIG. 1 shows a sectional illustration of an example of a machining head according to the invention, and FIG. 2 shows a section on line A—A through the example shown in FIG. 1.

In the example of a machining head according to the invention which is shown in FIG. 1, a housing which is formed from two parts 4, 5 is used, which parts are connected to one another by means of a screw thread 9, with the possibility of fixing the parts in a specific position by means of an additional locking nut 10. The screw thread 9 can be used to displace the two parts 4 and 5 of the housing relative to one another, resulting in telescopic displacement parallel to the longitudinal axis of a laser beam 7.

Using a beam-guiding means and, if appropriate, also a beam-shaping unit (not shown here), the laser beam 7 can be directed through the housing part 4 onto the surface of a diagrammatically depicted workpiece. The focusing of the laser beam 7 is set in such a way that a specific beam spot size can be obtained on the surface of the workpiece, approximately corresponding to the size of a focal point of a hollow powder jet. As can be seen from FIG. 1, the focus of the laser beam 7 may also be arranged inside the housing of the machining head.

In a form which is not illustrated, it is possible for an inert gas to be guided through the housing part 4 onto the surface of the workpiece in addition to the laser beam 7, which on the one hand allows improved cooling and on the other hand is able to prevent droplets which splash up from the surface from penetrating into the housing.

Both the part 4 and the part 5 of the housing are in this example designed with rotational symmetry about the longitudinal axis of the laser beam 7. A turbulence chamber 1, which surrounds the part 4 of the housing and into which radially opposite entry openings 11 lead in the upper area of the turbulence chamber 1, is formed between part 4 and part 5 of the housing. A powder-gas flow can be guided into the turbulence chamber 1 through each of the entry openings 11, and the powder components, which may be different, can be mixed inside the turbulence chamber 1. The bottom part of the turbulence chamber 1 is of conically tapering design, and an angle of inclination of the cone which prevents powder particles from sticking to the inner wall should be selected.

In this example, the turbulence chamber 1 leads into an inlet funnel 8, in which, in turn, there are entry openings for stabilizing passages 2. As can be seen from FIG. 1, the stabilizing passages 2 are aligned parallel to the longitudinal axis of the laser beam 7, and as can be seen in particular in FIG. 2, they are arranged radially symmetrically over the circumference, with a constant distance between them. The powder together with the carrier gas then passes through the cylindrical stabilizing passages 2 into an annular gap 14 which tapers conically in the direction of the surface of the workpiece. The cone angle of the annular gap 14 should be selected here in such a way that the coaxial hollow powder jet which emerges from the annular gap 14 strikes the surface of the workpiece with a small diameter, preferably at its focal point.

On the housing part 4, there is an exchangeable nozzle tip 6, which in this case is connected to the housing part 4 by means of a screw thread. At least part of the outer circumferential surface of the nozzle tip 6 forms in this case the inner wall of the annular gap 14.

On that side of the housing part 5 which faces the surface of the workpiece, a conical outer nozzle 3 is present or is formed. This outer nozzle 3 may also be of exchangeable design. The inner circumferential surface of the outer nozzle 3 then forms the outer wall of the annular gap 14. This design makes it possible to vary the clear width of the annular gap 14 by suitably rotating the two housing parts 4 and 5, resulting in a greater or lesser relative movement of the housing parts 4 and 5 with respect to the longitudinal axis of the laser beam 7 depending on the corresponding angle of rotation.

One or more cooling passages 12, 12' and 13, which are connected to one another and through which a cooling agent, preferably water, can pass in particular into the critical part of the machining head, are formed on the part 5 of the housing and, in addition, on the part 4. The annular cooling passage 13 can cool in particular the inner part 4 with nozzle tip 6. The cooling passage 12' acts in particular on the area of the outer nozzle 3. With this integrated cooling system, it is possible to readily deal with even the critical heating which is generated by prolonged machining.

With a machining head according to the invention of this nature, it is possible, for example, to make worn tools usable again. It is possible to restore damaged areas of the tool, even free-formed surfaces of complex geometry. However, applying the material to such surface areas requires an extremely high level of precision, which can be achieved with the machining head according to the invention.

In the case of a worn drop-forging die, it is possible, in a first operating step, for the actual worn contour of the die cavity to be determined by means of a digitizing system and for the difference from the known desired contour to be determined. Then, the difference in volume determined is broken down into a large number of horizontal planes, and by means of a post-processor the NC program for controlling the laser, machining unit with laser machining head and powder supply is generated, and the strategy for applying the material is established.

Then, in a further operating step, the actual repair welding takes place. For this purpose, it is necessary for the material to be welded on with an extremely high level of precision in accordance with the horizontal planes which have previously been calculated, in order for the missing volume of material to be built up again layer by layer.

In this process, by defocusing the laser beam 7 (Z position of the focusing optics with respect to the workpiece surface), it is possible to establish a beam spot with a diameter of about 2 mm on the workpiece surface. Then, the machining head and, here in particular, the position of the annular gap 14 with respect to the surface of the workpiece are set in such a way that the focal point of the hollow powder jet lies on the workpiece surface, so that it is possible to achieve a high independence from direction even in the event of rapid movements and changes in direction, and to achieve a high level of powder utilization.

For example, in the case of such a drop-forging die, it is possible to employ build-up welding using a powder, e.g. Stellite 21, with a delivery rate of 8 g/min. To produce the planar, uniform build-up beads, it is possible to set a laser power of 900 W and a feed rate of 600 mm/min, using a $CO_2$ laser. Under these conditions, the width of a single bead is 1.6 mm, and a gain in height from layer to layer in one plane of 0.3 mm is possible.

The machining head according to the invention allows homogenous distribution of powder, as mentioned above, coaxially with respect to the laser beam 7 and enables the material to be built up uniformly and without flaws even after hundreds of single beads. There are no excessively high layers at sudden transitions in the geometry of the workpiece. Very good contour accuracy can be achieved even without using intermediate metal-removing machining steps. The new microstructure formed is flawless, completely compact and the individual layers in the various planes formed on top of one another are securely joined to one another. The structural design of the machining head, with the intensive cooling which can be achieved, enables uninterrupted machining times of several hours to be readily achieved in stable form.

What is claimed is:

1. A machining head for surface machining by means of a laser beam, which has a housing in which a turbulence chamber is formed, into which chamber a powder-gas flow is introduced via at least one entry opening, and the powder-gas flow is guided through a conical annular gap, as a coaxial hollow jet, which, like the laser beam which is guided through the housing, is directed onto a workpiece surface, wherein stabilizing passages (2) are arranged in a radially symmetrical arrangement parallel to the longitudinal axis of the laser beam (7), between the turbulence chamber (1) and the annular gap (14).

2. The machining head as claimed in claim 1, wherein the turbulence chamber (1) opens into the stabilizing passages (2) via an inlet funnel (8).

3. The machining head as claimed in claim 1, wherein the cylindrical stabilizing passages (2) are at least 10 mm long and are distributed at regular intervals over the circumference of the inlet funnel (8).

4. The machining head as claimed in claim 1, wherein two entry openings (11) are present, radially opposite one another, at the turbulence chamber (1).

5. The machining head as claimed in claim 1, wherein the sum of the free cross-sectional areas of the stabilizing passages (2) is greater than or equal to the free cross-sectional area of the entry opening or openings (11).

6. The machining head as claimed in claim 1, wherein the cone angle of the annular gap (14) ensures that the focal point of the conically tapering hollow powder jet lies outside the machining head.

7. The machining head as claimed in claim 6, wherein the machining head is arranged or guided in such a way that the focal point of the coaxial hollow powder jet lies on the surface of the workpiece.

8. The machining head as claimed in claim 1, wherein the housing is split in two; and the two parts (4, 5) of the housing are displaceable relative to one another, the two parts (4, 5) of the housing forming an annular gap (14) of variable clear width.

9. The machining head as claimed in claim 8, wherein the two parts (4, 5) of the housing are connected by means of a screw thread.

10. The machining head as claimed in claim 8, wherein the two parts (4, 5) of the housing can be displaced relative to one another by means of a linear drive or a rotary drive.

11. The machining head as claimed in claim 8, wherein the two parts (4, 5) of the housing can be displaced telescopically by means of electromagnets.

12. The machining head as claimed in claim 1, wherein the housing predominantly comprises a material of good thermal conductivity.

13. The machining head as claimed in claim 12, wherein the housing is composed of copper and/or a copper alloy.

14. The machining head as claimed in claim 11, wherein the housing is coated with nickel or a nickel alloy.

15. The machining head as claimed in claim 1, wherein cooling passages (12, 13) are formed in the housing.

16. The machining head as claimed in claim 1, wherein a protective layer is formed, or a protective disk is arranged, on that side of the machining head which faces toward the surface of the workpiece.

17. The machining head as claimed in claim 1, wherein an exchangeable nozzle tip (6), the outer circumferential surface of which forms the inner wall of the annular gap (14), is attached to a part (4) of the housing through which the laser beam (7) is directed.

18. The machining head as claimed in claim 1, wherein the outer part (5) of the housing ends, in the direction of the workpiece, in a conical outer nozzle (3), the inner circumferential surface of which forms the outer wall of the annular gap (14).

19. The machining head as claimed in claim 1, wherein a continuously encircling annular duct (13) is formed in the inner part (4) of the housing, for cooling purposes.

20. The machining head as claimed in claim 1, wherein a powder-gas outlet passage, which can be closed by means of a valve, is connected to the turbulence chamber (1).

21. A process for surface machining by means of a laser beam, using a machining head as claimed in claim 1, wherein a laser beam (7) is directed onto the surface of a workpiece through a housing, a powder-gas flow is introduced into a turbulence chamber (1) formed in the housing, is mixed by means of turbulence and is homogeneously distributed with respect to the longitudinal axis of the laser beam (7); and the mixed powder is guided parallel to the longitudinal axis of the laser beam (7) through cylindrical stabilizing passages (2) and then through a conical annular gap (14), in such a way that the focal point of the conically tapering hollow powder jet lies outside the machining head.

22. The process as claimed in claim 21, wherein the volumetric flow rate of powder directed at the surface of the workpiece is controlled by varying the clear width of the annular gap (14).

23. The process as claimed in claim 21, wherein the clear width of the annular gap (14) is varied by means of a relative movement of two parts (4, 5) of the housing.

24. The process as claimed in claim 21, wherein the size of the focal point of the conically tapering hollow powder jet is set in accordance with the size of the beam spot of the laser beam (7) on the surface of the workpiece.

* * * * *